(12) United States Patent
Shields

(10) Patent No.: US 12,194,531 B2
(45) Date of Patent: Jan. 14, 2025

(54) THREE-DIMENSIONAL PRINTING

(71) Applicant: Hewlett-Packard Development Company, L.P., Spring, TX (US)

(72) Inventor: James P Shields, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 434 days.

(21) Appl. No.: 17/296,507

(22) PCT Filed: Apr. 29, 2019

(86) PCT No.: PCT/US2019/029578
§ 371 (c)(1),
(2) Date: May 24, 2021

(87) PCT Pub. No.: WO2020/222730
PCT Pub. Date: Nov. 5, 2020

(65) Prior Publication Data
US 2022/0072614 A1    Mar. 10, 2022

(51) Int. Cl.
*B22F 10/14*    (2021.01)
*B22F 1/107*    (2022.01)
*B22F 1/12*    (2022.01)
*B22F 3/11*    (2006.01)
*B22F 10/38*   (2021.01)
*B33Y 10/00*   (2015.01)
*B33Y 70/10*   (2020.01)
*C08J 9/32*    (2006.01)

(52) U.S. Cl.
CPC .............. *B22F 10/14* (2021.01); *B22F 1/107* (2022.01); *B22F 3/1112* (2013.01); *B22F 10/38* (2021.01); *B33Y 10/00* (2014.12); *B33Y 70/10* (2020.01); *C08J 9/32* (2013.01); *B22F 1/12* (2022.01); *B22F 2998/10* (2013.01); *C08J 2333/08* (2013.01)

(58) Field of Classification Search
CPC ........ B22F 10/14; B22F 3/1112; B22F 10/38; B22F 2998/10; B33Y 10/00; B33Y 70/10; C08J 2333/08; B29C 64/165
See application file for complete search history.

(56) References Cited

U.S. PATENT DOCUMENTS

| | | | |
|---|---|---|---|
| 6,806,018 B2 * | 10/2004 | Kanga | B41C 1/05 430/394 |
| 7,166,326 B1 | 1/2007 | DiStefano | |
| 2001/0019765 A1 | 9/2001 | Kiuchi et al. | |
| 2006/0219350 A1 | 10/2006 | Bain et al. | |

(Continued)

FOREIGN PATENT DOCUMENTS

| | | | | |
|---|---|---|---|---|
| EP | 2001656 B1 * | 10/2014 | ........... | B29C 64/165 |
| WO | WO-2015036124 A1 | 3/2015 | | |

(Continued)

*Primary Examiner* — Brian D Walck
*Assistant Examiner* — Nazmun Nahar Shams
(74) *Attorney, Agent, or Firm* — HP Inc. Patent Department

(57) ABSTRACT

This application describes kits, methods, and systems of three dimensional printing. In some examples, described herein are three-dimensional object printing kits comprising a metallic or a ceramic build material, a polymeric binder dispersed in an aqueous liquid vehicle, and a boundary fluid comprising thermally expandable particles.

14 Claims, 2 Drawing Sheets

(56) References Cited

U.S. PATENT DOCUMENTS

2012/0034407 A1    2/2012  Yamanaka et al.
2017/0297099 A1   10/2017  Gibson et al.
2019/0111479 A1    4/2019  Kasperchik et al.

FOREIGN PATENT DOCUMENTS

WO    WO-2017187800 A1    11/2017
WO    WO-2018156933 A1 *  8/2018  ............ B22F 1/0011

\* cited by examiner

THREE-DIMENSIONAL PRINTING

BACKGROUND

Three-dimensional (3D) printing is an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
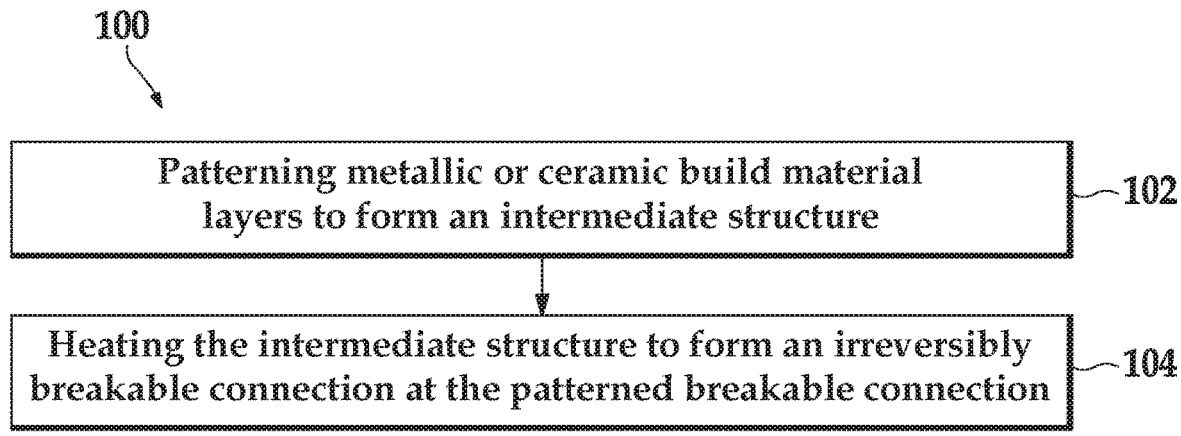
FIG. 1 is a flow diagram illustrating an example of a 3D printing method disclosed herein.

In some examples of 3D printing, after a 3D print job is finished being printed, the result is a build volume comprising a block of build material that contains solidified 3D objects within the block. Such blocks of build material can be produced, for example, with powder-based printing systems that implement a layer-by-layer accumulation and solidification of powdered build material. The build material used to print 3D objects in such layer-by-layer 3D printing processes can include various powdered materials such as polystyrene, ceramics, glass, nylon, and metals including steel, titanium, aluminum, and silver. A block of build material containing a 3D object may therefore be alternately referred to herein as a "cake", a "powder cake", a "build cake", a "powdered build cake", and the like.

The strength or firmness of the powder cake surrounding the 3D object can depend on various factors associated with the particular printing process used to generate the cake. Such factors can include, for example, the type of powdered build material used, the amount of preheat applied to the layers of build material, the amount of heat or fluid applied to consolidate selected regions of build material layers, and so on. Thus, in different examples, in addition to a partially or fully fused and solidified 3D object, the cake may comprise a continuum of build material that ranges in firmness from loosely bound powder to weakly fused powder. In some examples, the cake may comprise more firmly fused powder in areas closer to the 3D object that have been exposed to higher levels of heat during printing or which contain solvents or other fluid components which have migrated into the non-object areas.

Accordingly, after a printing process is completed, extracting 3D objects from the powder cake can involve a number of post printing processes. For example, an initial post printing process can include allowing time for the heated cake to cool off before extracting the objects. In some examples, the cake can be removed from the printing system and placed in a cool environment to help speed the cooling. If the cake comprises loosely bound powder, a next process in extracting a 3D object can include digging into the loose powder and carefully removing the object by hand. However, in some examples where the cake comprises partially consolidated powder, a next process can include physically fracturing the cake to break pieces of the cake away from the 3D object or objects. Other post printing process can include cleaning the 3D objects using pressurized air, brushes, or other tools to remove the remaining fine powder, polishing surfaces of the objects, applying a coating to the surfaces of the objects, and so on.

These and other post printing processes can involve significant human interaction with the powder cake. For example, prior to breaking apart a cake comprising partially fused powder, the cake can be physically removed from the 3D printing device and relocated to a setting that is conducive to applying mechanisms to the cake that can cause the cake to break apart. Such mechanisms have generally included various types of hand held instruments such as hammers, trowels, brushes, and so on. These and other instruments can be used to further break up the cake into smaller and smaller pieces so that the powder can be cleared away from the 3D object or objects. Such post printing processes can add significant time, labor, and cost to the creation of 3D printed parts.

Accordingly, examples of systems and methods for extracting three-dimensional (3D) objects are described herein that enable automated extraction of 3D objects from powdered build cakes created in 3D printing devices. In some examples, a system employs a boundary fluid comprising thermally expandable particles that can be heated, to exert force on the unconsolidated clinging powder particles within the cake that help to fracture the cake.

Definitions

Throughout this disclosure, it is to be understood that terms used herein will take on their ordinary meaning in the relevant art unless specified otherwise. Several terms used herein and their meanings are set forth below.

The singular forms "a", "an", and "the" include plural referents unless the context clearly dictates otherwise.

The terms comprising, including, containing and various forms of these terms are synonymous with each other and are meant to be equally broad.

As used herein, the terms "remaining region of the patterned intermediate part," "portion of the patterned intermediate part," or "layer of the patterned intermediate part" refers to a subsection of the intermediate part that does not have a shape representative of the final 3D printed part, and that includes build material particles patterned with a binding liquid functional agent (i.e., binder fluid). In the remaining portion, the portion, or the layer of the patterned intermediate part, the build material particles may or may not be weakly bound together by one or more components of the binding liquid functional agent and/or by attractive force(s) between the build material particles and the binder fluid.

Moreover, it is to be understood that any build material that is not patterned with the binder fluid is not considered to be part of the portion of the patterned intermediate part, even if it is adjacent to or surrounds the portion of the patterned intermediate part.

As used herein, the term "patterned intermediate part" refers to an intermediate part that has a shape representative of the final 3D printed part, and that includes build material particles patterned with the binder fluid. In the patterned intermediate part, the build material particles may or may not be weakly bound together by one or more components of the binder fluid and/or by attractive force(s) between the build material particles and the binder fluid. In some instances, the mechanical strength of the patterned intermediate part is such that it cannot be handled or extracted from a build platform. Moreover, it is to be understood that any build material that is not patterned with the binding liquid functional agent is not considered to be part of the patterned intermediate part, even if it is adjacent to or surrounds the patterned intermediate part.

As used herein, the term "intermediate structure" refers to the patterned intermediate part.

As used herein, the term "partially consolidated intermediate part" refers to a patterned intermediate part from which the liquid components of the binder fluid have at least substantially evaporated. At least substantial evaporation of the liquid components of the binder fluid leads to partial densification of the intermediate part, which may be due to capillary compaction. The at least substantial evaporation of the liquid components of the binder fluid may also allow the binder to bind the build material particles of the partially consolidated intermediate part. In other words, the "partially consolidated intermediate part" is an intermediate part with a shape representative of the final 3D printed part and that includes the build material particles bound together by the binder.

The patterned or partially consolidated intermediate part may be known as a green part, but it is to be understood that the term "green" when referring to the patterned intermediate/green part or the partially consolidated intermediate/green part does not connote color, but rather indicates that the part is not yet fully processed.

As used herein, the term "at least substantially binder-free intermediate part" refers to an intermediate part that has been exposed to a heating process that initiates thermal decomposition of the binder so that the temporary binder is at least partially removed. In some instances, volatile organic components of, or produced by the thermally decomposed binder are completely removed and a very small amount of non-volatile residue from the thermally decomposed binders may remain. The small amount of the non-volatile residue is generally <2 wt % of the initial binder amount, and in some instances is <0.1 wt % of the initial binder amount. In other instances, the thermally decomposed binder (including any products and residues) is completely removed. In other words, the "at least substantially binder-free intermediate part" refers to an intermediate part with a shape representative of the final 3D printed part and that includes build material particles bound together as a result of i) weak sintering (i.e., low level necking between the particles, which is able to preserve the part shape), or ii) a small amount of the non-volatile binder residue remaining, and/or iii) a combination of i and ii.

The "at least substantially binder-free intermediate" part may have porosity similar to or greater than the partially consolidated intermediate part (due to temporary binder removal), but the porosity is at least substantially eliminated during the transition to the 3D printed part/object.

The "at least substantially binder-free intermediate" part may be known as a gray part, but it is to be understood that the term "gray" when referring to the at least substantially binder-free gray part does not connote color, but rather indicates that the part is not yet fully processed.

As used herein, the terms "3D printed part or object," "3D part," and "3D object" refer to a completed, sintered part.

As used herein, the "boundary fluid" or "boundary fluid comprising thermally expandable particles" refers to a liquid functional agent that includes thermally expandable particles composed of a blowing agent (hydrocarbon liquid) encapsulated in a polymeric shell. The thermally expandable particles, on heating, expand due to volumetric change of the blowing agent (hydrocarbon liquid) and softening of the thermoplastic shell. The expanded liquid (or partial vapor) still trapped within the polymeric shell leads to a change in the size of the expandable particle. Due to the volumetric change of the particle, the polymeric shell 'thins' down. The thermally expandable microspheres will exert a force against surrounding material within a portion of the intermediate structure that is patterned with the boundary fluid. The effect on the partially consolidated green part particles will be minimal. However, for the unconsolidated clinging particles outside the object perimeter, they will be influenced by the force of the expanding microspheres and will break away from the green part. As a result, minimal or no manual brushing of clinging powder is needed. In some examples, the boundary fluid comprising thermally expandable particles is a separate agent used in combination with the polymeric binder dispersed in aqueous liquid vehicle. In these examples, the boundary fluid comprising thermally expandable particles does not include a polymeric binder dispersed in aqueous liquid vehicle. In other examples, the boundary fluid comprising thermally expandable particles may also include the polymeric binder dispersed in aqueous liquid vehicle that can temporarily bind the build material. Examples of the boundary fluid comprising thermally expandable particles are described further herein below.

Also as used herein, the "polymeric binder dispersed in aqueous liquid vehicle or "binder fluid" or "binder" refers to a patterning fluid that includes a binder, but that does not include the thermally expandable particles that will expand upon heating. Examples of the binder fluid are described further herein below. In some cases, the polymeric binder can be soluble in the aqueous liquid vehicle.

It is to be understood that the weight percentages provided herein may vary, depending upon the weight percentage of the active components within a solution, dispersion, etc. used to form the binder fluid, boundary fluid comprising thermally expandable particles, etc., and also on the desired weight percentage of the active components within the binder fluid, boundary fluid comprising thermally expandable particles, etc. For example, if a dispersion (to be added to the binder fluid) includes 10% of the active component, and the target weight percentage of the active component in the binder fluid is 0.01%, then the amount of the dispersion that is added is 0.1% to account for the non-active components in the dispersion.

The examples disclosed herein provide several methods for forming the intermediate structure and the final sintered object. In some examples, both the boundary fluid comprising thermally expandable particles and the binding liquid functional agent are utilized in forming the intermediate structure and the final sintered object. In the examples disclosed herein, the same types of build material, boundary fluid comprising thermally expandable particles, and/or binding liquid functional agents may be used. Each of the components will now be described. In some examples, disclosed are three-dimensional object printing kits. These three-dimensional object printing kits can comprise a metallic or a ceramic build material; a polymeric binder dispersed in an aqueous liquid vehicle; and a boundary fluid comprising thermally expandable particles.

In some examples, the metallic build material is steel, bronze, titanium, titanium alloys, aluminum, aluminum alloys, nickel, nickel alloys, cobalt, cobalt alloys, iron, iron alloys, nickel cobalt, nickel cobalt alloys, gold, gold alloys, silver, silver alloys, platinum, platinum alloys, copper, copper alloys, zirconium, zirconium alloys, or a combination thereof; and the ceramic build material is an oxide, a nitride, a carbide, an aluminum oxide, aluminum-calcium-phosphorus oxides, bio glasses, boron nitride, boron carbide, borosilicate glass, calcium aluminates, calcium sulfates, ceravital, corals, ferric-calcium-phosphorus oxides, hydroxyapatites, dense hydroxyapatites, silica, silicon boride, silicon oxide, silicon nitride, titanium oxide, titanium nitride, tri-calcium phosphate, zinc-calcium-phosphorus oxides, zinc sulfate-calcium-phosphorus oxides, zinc oxide, zirconia, hydroxyapatite, alumina, oxide glass, or a combination thereof.

In some examples, the metallic build material is AlSi10Mg, 2xxx series aluminum, 4xxx series aluminum, CoCr MP1, CoCr SP2, Maraging Steel MS1, Hastelloy C, Hastelloy X, NickelAlloy HX, Inconel IN625, Inconel IN718, SS GP1, SS 17-4PH, SS 316L, SS 430L, Ti6Al4V, Ti-6Al-4V ELI7, or combinations thereof.

In some examples, the polymeric binder comprises latex polymer particles dispersed in an aqueous liquid vehicle, wherein the latex polymer particles are made from (A) a co-polymerizable surfactant and (B) styrene, p-methyl styrene, α-methyl styrene, methacrylic acid, acrylic acid, acrylamide, meth acrylamide, 2-hydroxyethyl acrylate, 2-hydroxyethyl methacrylate. 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinyl benzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated benzyl methacrylate, polypropylene glycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinyl carbazole, N-vinyl-caprolactam, or combinations thereof.

In some examples, the thermally expandable particles comprise a hydrocarbon core and a polymeric shell.

In some examples, the boundary fluid comprises the thermally expandable particles in an amount of from about 1 wt % to about 25 wt % based on the total weight of the boundary fluid.

In some examples, the thermally expandable particles are heated to a temperature of from about 80° C. to about 250° C.

In some examples, described herein is a method for three-dimensional (3D) printing. The method for 3D printing can comprise: patterning metallic or ceramic build material layers to form an intermediate structure, the patterning including: selectively applying a polymeric binder dispersed in an aqueous liquid vehicle to define a patterned intermediate part; and selectively applying a boundary fluid adjacent to the patterned intermediate part, the boundary fluid including: thermally expandable particles, wherein the thermally expandable particles have a core shell structure; and upon removal of the caked intermediate structure, heating the caked intermediate structure to cause the spheres to expand and exert a force on unconsolidated clinging metal powder to fall off. It is to be understood that the patterned connection between the several layers of the build material intermediate structure and the unconsolidated clinging powder particles is the boundary fluid comprising thermally expandable particles applied on the individual build material layers at the perimeter of the object.

In some examples, the thermally expandable particles are plastic microspheres, phenolic and amino-based spheres, thermoplastic microspheres, Expancel WU1™, Expancel DU™, Expancel SL™, Expancel MB™, Advancell EM™ Kureha Microsphere, Matsumoto Microsphere, or combinations thereof.

In some examples, the intermediate part obtained after removal of the unconsolidated clinging powder is sintered to a sintering temperature of the metallic build material to form a metal 3D object.

In some examples, the patterning of the build material layers includes: iteratively applying individual metallic build material layers; selectively applying the polymeric binder to each of the individual metallic build material layers to define several layers of the patterned intermediate part; and selectively applying the boundary fluid on each of the individual build material layers to define the patterned connection between the several layers of the build material boundary area and the unconsolidated clinging powder particles.

In some examples, disclosed herein is a multi-fluid kit for three-dimensional (3D) printing. The multi-fluid kit can comprise: a polymeric binder dispersed in an aqueous liquid vehicle, wherein the polymeric binder comprises an aqueous liquid vehicle and latex polymer particles dispersed in the aqueous liquid vehicle, and wherein the latex polymer particles are made from (A) a co-polymerizable surfactant and (B) styrene, p-methyl styrene, α-methyl styrene, methacrylic acid, acrylic acid, acrylamide, meth acrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinyl benzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated benzyl methacrylate, polypropylene glycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinyl carbazole, N-vinyl-caprolactam, or combinations thereof; and a boundary fluid comprising thermally expandable particles, wherein the thermally expandable particles comprise a hydrocarbon core and a polymeric shell.

Metal Powder Build Material

Single elements or alloys may be used as the metal powder build material 14. Some examples of the metal powder build material 14 include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 314L, Ti6Al4V, and Ti-6Al-4V ELI7. While several example alloys have been provided, it is to be understood that other alloy build materials may be used, such as PbSn soldering alloys.

Any metal powder build material 14 may be used that is in powder form at the outset of the 3D printing method(s) disclosed herein. As such, the melting point, solidus temperature, eutectic temperature, and/or peritectic temperature of the metal powder build material 14 may be above the temperature of the environment in which the patterning portion of the 3D printing method is performed (e.g., above 40° C.). In some examples, the metal powder build material 14 may have a melting point ranging from about 850° C. to about 3500° C. In other examples, the metal powder build material 14 may be an alloy having a range of melting points.

The metal powder build material 14 may be made up of similarly sized particles or differently sized particles. In the examples shown herein (FIG. 1), the metal powder build material 14 includes similarly sized particles. The term "size", as used herein with regard to the metal powder build material 14, refers to the diameter of a substantially spherical particle (i.e., a spherical or near-spherical particle having a sphericity of >0.84), or the average diameter of a non-spherical particle (i.e., the average of multiple diameters across the particle). Substantially spherical particles of this particle size have good flowability and can be spread relatively easily. As an example, the average particle size of the particles of the metal powder build material 14 may range from about 1 µm to about 200 µm. As another example, the average size of the particles of the metal powder build material 14 ranges from about 10 µm to about 150 µm. As still another example, the average size of the particles of the metal powder build material 14 ranges from 15 µm to about 100 µm.

The ceramics may be nonmetallic, inorganic compounds, such as metal oxides, inorganic glasses, carbides, nitrides, and borides. Some specific examples include alumina ($Al_2O_3$), $Na_2O/CaO/SiO_2$ glass (soda-lime glass), silicon carbide (SiC), silicon nitride ($Si_3N_4$), silicon dioxide ($SiO_2$), zirconia ($ZrO_2$), yttrium oxide-stabilized zirconia (YTZ), titanium dioxide ($TiO_2$), or combinations thereof. In an example, the build material powder may be a cermet (a metal-ceramic composite).

Boundary Fluid

The boundary fluid may be used to pattern build material where it is desirable to form the intermediate structure. Some examples of the boundary fluid are used with a combined agent containing the binder fluid.

In some examples, the boundary fluid disclosed herein are aqueous (i.e., water) based liquids including thermally expandable particles. In other examples, the boundary fluid disclosed herein are solvent based liquids including the thermally expandable particles.

The boundary fluid includes thermally expandable particles that are to be activated, at a temperature between 100° C. to 250° C. to exert a force against the particles that surround them. The thermally expandable particles are selected such that it undergoes activation to exert a force against the particles that surround them.

In an example, the thermally expandable particle is selected from the group consisting of plastic microsphere, phenolic and amino-based sphere, thermoplastic microspheres, Expancel WU1™, Expancel DU™, Expancel SL™, Expancel MB™ Advancell EM™, Kureha Microsphere, Matsumoto Microsphere.

At temperatures between about 80° C. to about 210° C., EXPANCEL™ particles expand due to volumetric change of the blowing agent (hydrocarbon liquid). The expanded liquid (or partial vapor) is still trapped within the polymeric shell and therefore, leads to a change in the size of the EXPANCEL™ particles. Due to the volumetric change of the EXPANCEL™ particles, the polymeric shell 'thins' down. EXPANCEL™ particles can be readily incorporated into the aqueous based agents disclosed herein.

The thermally expandable particles may be present in the boundary fluid in an amount ranging from about 1 wt % to about 50 wt % of the total weight of the boundary fluid. In another example, the thermally expandable particles may be present in the boundary fluid in an amount less than 30 wt % of the total weight of the boundary fluid. In another example, the thermally expandable particles may be present in the boundary fluid in an amount at least more than 5 wt % of the total weight of the boundary fluid. In another example, the thermally expandable particles may be present in the boundary fluid in an amount at least more than 10 wt % of the total weight of the boundary fluid. These percentages may include both thermally expandable particles and other non-active components present with the compound. It is to be understood that the upper limit may be increased as long as the boundary fluid can be jetted via a desired inkjet printhead.

When the boundary fluid is used with a combined agent containing the binder fluid, the boundary fluid may include the previously described compound (i.e., thermally expandable particle), any of a surfactant or a dispersing aid, a co-solvent, and a balance of water. The combined agent containing the boundary fluid may also include antimicrobial agent(s) and/or anti-kogation agent(s) but does not include a binder.

The co-solvent may be an organic co-solvent present in the boundary fluid in an amount ranging from about 2 wt % to about 40 wt % (based on the total weight of the boundary fluid). It is to be understood that other amounts outside of this range may also be used depending, at least in part, on the jetting architecture used to dispense the boundary fluid. The organic co-solvent may be any water miscible, high-boiling point solvent, which has a boiling point of at least 120° C. Classes of organic co-solvents that may be used include aliphatic alcohols, aromatic alcohols, diols, glycol ethers, polyglycol ethers, 2-pyrrolidones/pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the boundary fluid may include 2-pyrrolidone, 1,2-butanediol, 2-methyl-1,3-propanediol, 1-(2-hydroxyethyl)-2-pyrrolidone, or combinations thereof.

The boundary fluid may also include surfactant(s) and/or dispersing aid(s). Surfactant(s) and/or dispersing aid(s) may be used to improve the wetting properties and the jettability of the boundary fluid. Examples of suitable surfactants and dispersing aids include those that are non-ionic, cationic, or anionic. Examples of suitable surfactants/wetting agents include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), and combinations thereof. In a specific example, the surfactant is a non-ionic, ethoxylated acetylenic diol (e.g., SURFYNOL® 465 from Air Products and Chemical Inc.). In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or secondary alcohol ethoxylates (commercially available as TERGITOL® TMN-6, TERGITOL® 15-S-7, TERGITOL® 15-S-9, etc. from The Dow Chemical Co.). In some examples, it may be desirable to utilize a surfactant having a hydrophilic-lipophilic balance (HLB) less than 10. Examples of suitable dispersing aid(s) include those of the SILQUEST™ series from Momentive, including SILQUEST™ A-1230. Whether a single surfactant or dispersing aid is used or a combination of surfactants and/or dispersing aids is used, the total amount of surfactant(s) and/or dispersing aid(s) in the boundary fluid may range from about 0.1 wt % to about 6 wt % based on the total weight of the boundary fluid.

The boundary fluid may also include antimicrobial agent(s). Suitable antimicrobial agents include biocides and fungicides. Example antimicrobial agents may include the NUOSEPT® (Ashland Inc.), UCARCIDE™ or KORDEK™ or ROCIMA™ (Dow Chemical Co.), PROXEL® (Arch Chemicals) series, ACTICIDER B20 and ACTICIDER M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. In an example, the boundary fluid may include a total amount of antimicrobial agents that ranges from about 0.01 wt % to about 1 wt %. In an example, the antimicrobial agent is a biocide and is present in the boundary fluid in an amount of about 0.1 wt % (based on the total weight of the boundary fluid). These percentages may include both active antimicrobial agent and other non-active components present with the antimicrobial agent.

An anti-kogation agent may also be included in the boundary fluid. Kogation refers to the deposit of dried solids on a heating element of a thermal inkjet printhead. Anti-kogation agent(s) is/are included to assist in preventing the buildup of kogation, and thus may be included when the boundary fluid is to be dispensed using a thermal inkjet printhead. Examples of suitable anti-kogation agents include oleth-3-phosphate (commercially available as CRODAFOS™ O3A or CRODAFOS™ N-3 acid) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the boundary fluid in an amount ranging from about 0.1 wt % to about 1 wt % of the total weight of the boundary fluid.

In some examples, the balance of the boundary fluid is water (e.g., deionized water). In these examples, the amount of water may vary depending upon the weight percent of the other boundary fluid components. In other examples, the balance of the boundary fluid is a solvent (e.g., any of the previously listed co-solvent(s)).

An example formulation of the boundary fluid that does not include a binder, is shown in Table 1. This example includes Kureha S2640 as the thermally expandable particle.

TABLE 1

| Component Type | Example Specific Components | Target (wt %) |
| --- | --- | --- |
| Co-solvent | 1-(2-Hydroxyethyl)-2-pyrrolidone (HE-2P) | 10 |
| Surfactant | Tergitol 15-S-7 | 1 |
| Antimicrobial | Acticide ® B20 | 0.15 |
| Thermally expandable particles | Kureha S2640 microspheres | 14.6 |
| Water | Deionized Water | Balance |

Binders

A. Latex Binders

Examples of suitable binders include latexes (i.e., an aqueous dispersion of polymer particles), polyvinyl alcohol, polyvinylpyrrolidone, and combinations thereof.

The polymer particles may be any latex polymer (i.e., polymer that is capable of being dispersed in an aqueous medium) that is jettable via inkjet printing (e.g., thermal inkjet printing or piezoelectric inkjet printing). In some examples disclosed herein, the polymer particles are heteropolymers or co-polymers. The heteropolymers may include a more hydrophobic component and a more hydrophilic component. In these examples, the hydrophilic component renders the particles dispersible in the binder agent 14, while the hydrophobic component is capable of coalescing upon exposure to heat in order to temporarily bind the host metal particles 15.

The polymer particles of the latex may have several different morphologies. The polymer particles may include two different copolymer compositions, which may be fully separated core-shell polymers, partially occluded mixtures, or intimately comingled as a polymer solution. In an example, the polymer particles may be individual spherical particles containing polymer compositions of hydrophilic (hard) component(s) and/or hydrophobic (soft) component(s) that may be interdispersed according to IPN (interpenetrating networks), although it is contemplated that the hydrophilic and hydrophobic components may be interdispersed in other ways. For another example, the polymer particles may be made of a hydrophobic core surrounded by a continuous or discontinuous hydrophilic shell. For another example, the polymer particle morphology may resemble a raspberry, in which a hydrophobic core is surrounded by several smaller hydrophilic particles that are attached to the core. For still another example, the polymer particles may include 2, 3, or 4 or more relatively large particles that are at least partially attached to one another or that surround a smaller polymer core. The polymer particles of the latex may have a single phase morphology, may be partially occluded, may be multiple-lobed, or may include any combination of any of the morphologies disclosed herein.

The latex polymer particles may have a weight average molecular weight ranging from about 5,000 to about 500,000. As examples, the weight average molecular weight of the latex particles may range from about 10,000 to about 500,000, from about 100,000 to about 500,000, or from about 150,000 to about 300,000.

Latex particles may include a heteropolymer including a hydrophobic component that makes up from about 65% to about 99.9% (by weight) of the heteropolymer, and a hydrophilic component that makes up from about 0.1% to about 35% (by weight) of the heteropolymer, where the hydrophobic component may have a lower glass transition temperature than the hydrophilic component. In general, a lower content of the hydrophilic component is associated with easier use of the latex particles under typical ambient conditions. As used herein, typical ambient conditions include a temperature range from about 20° C. to about 25° C., an atmospheric pressure of about 100 kPa (kilopascals), and a relative humidity ranging from about 30% to about 90%. The glass transition temperature of the latex particles may range from about −20° C. to about 130° C., or in a specific example, from about 60° C. to about 105° C.

Examples of monomers that may be used to form the hydrophobic component include low Tg monomers. Some examples include $C_4$ to $C_8$ alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol methacrylate, diethylene glycol methacrylate, triethylene glycol methacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), 1,3-butadiene, vinyl chloride, vinylidene chloride, vinyl benzyl chloride, acrylonitrile, methacrylonitrile, N-vinyl imidazole, N-vinyl carbazole, N-vinyl-caprolactam, combinations thereof, derivatives thereof, or mixtures thereof.

The heteropolymer may be formed of at least two of the previously listed monomers, or at least one of the previously listed monomers and a higher $T_g$ hydrophilic monomer, such as an acidic monomer. Examples of acidic monomers that can be polymerized in forming the latex polymer particles include acrylic acid, methacrylic acid, ethacrylic acid, dimethyl acrylic acid, maleic anhydride, maleic acid, vinyl sulfonate, cyanoacrylic acid, vinyl acetic acid, allyl acetic acid, ethylidineacetic acid, propylidineacetic acid, crotonoic acid, fumaric acid, itaconic acid, sorbic acid, angelic acid, cinnamic acid, styryl acrylic acid, citraconic acid, glutaconic acid, aconitic acid, phenyl acrylic acid, acryloxypropionic acid, vinyl benzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy) propane-1-sulfonic acid, ethylene sulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In an example, the selected monomer(s) is/are polymerized to form a polymer, heteropolymer, or copolymer. In some examples, the monomer(s) are polymerized with a co-polymerizable surfactant. In some examples, the co-polymerizable surfactant can be a polyoxyethylene compound. In some examples, the co-polymerizable surfactant can be a HITENOL® compound e.g., polyoxyethylene alkyl phenyl ether ammonium sulfate, sodium polyoxyethylene alkyl ether sulfuric ester, polyoxyethylene styrenated phenyl ether ammonium sulfate, or mixtures thereof.

The polymer particles may have a particle size that can be jetted via thermal inkjet printing or piezoelectric printing or continuous inkjet printing. In an example, the particle size of the polymer particles ranges from about 10 nm to about 300 nm.

Any suitable polymerization process may be used. In examples, the aqueous dispersion of polymer particles (latexes) may be produced by emulsion polymerization or co-polymerization of any of the previously listed monomers.

In an example, the polymer particles may be prepared by polymerizing high $T_g$ hydrophilic monomers to form the high $T_g$ hydrophilic component and attaching the high $T_g$ hydrophilic component onto the surface of the low $T_g$ hydrophobic component.

In another example, each of the polymer particles may be prepared by polymerizing the low $T_g$ hydrophobic monomers and the high $T_g$ hydrophilic monomers at a ratio of the low $T_g$ hydrophobic monomers to the high $T_g$ hydrophilic monomers that ranges from 5:95 to 30:70. In this example, the soft low $T_g$ hydrophobic monomers may dissolve in the hard high $T_g$ hydrophilic monomers.

In still another example, each of the polymer particles may be prepared by starting the polymerization process with the low $T_g$ hydrophobic monomers, then adding the high $T_g$ hydrophilic monomers, and then finishing the polymerization process. In this example, the polymerization process may cause a higher concentration of the high $T_g$ hydrophilic monomers to polymerize at or near the surface of the low $T_g$ hydrophobic component.

In still another example, each of the polymer particles may be prepared by starting a copolymerization process with the low $T_g$ hydrophobic monomers and the high $T_g$ hydrophilic monomers, then adding additional high $T_g$ hydrophilic monomers, and then finishing the copolymerization process. In this example, the copolymerization process may cause a higher concentration of the high $T_g$ hydrophilic monomers to copolymerize at or near the surface of the low $T_g$ hydrophobic component.

Other suitable techniques, specifically for generating a core-shell structure, may be used, such as: i) grafting a hydrophilic shell onto the surface of a hydrophobic core, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method known in the art to generate a more hydrophilic shell relative to the core.

The low $T_g$ hydrophobic monomers and/or the high $T_g$ hydrophilic monomers used in any of these example methods may be any of the low $T_g$ hydrophobic monomers and/or the high $T_g$ hydrophilic monomers (respectively) listed above. In an example, the low $T_g$ hydrophobic monomers are selected from the group consisting of $C_4$ to $C_8$ alkyl acrylate monomers, $C_4$ to $C_8$ alkyl I methacrylate monomers, styrene monomers, substituted methyl styrene monomers, vinyl monomers, vinyl ester monomers, and combinations thereof; and the high $T_g$ hydrophilic monomers are selected from the group consisting of acidic monomers, unsubstituted amide monomers, alcoholic acrylate monomers, alcoholic methacrylate monomers, $C_1$ to $C_2$ alkyl acrylate monomers, $C_1$ to $C_2$ alkyl methacrylate monomers, and combinations thereof.

The resulting polymer particles may exhibit a core-shell structure, a mixed or intermingled polymeric structure, or some other morphology.

In some examples, the polymer particles have a MFFT or a glass transition temperature ($T_g$) that is greater (e.g., >) than ambient temperature. In other examples, the polymer particles have a MFFT or $T_g$ that is much greater (e.g., >>) than ambient temperature (i.e., at least 15° higher than ambient). As mentioned herein, "ambient temperature" may refer to room temperature (e.g., ranging about 18° C. to about 22° C.), or to the temperature of the environment in which the 3D printing method is performed. Examples of the 3D printing environment ambient temperature may range from about 40° C. to about 50° C. The MFFT or the $T_g$ of the bulk material (e.g., the more hydrophobic portion) of the polymer particles may range from 25° C. to about 125° C. In an example, the MFFT or the $T_g$ of the bulk material (e.g., the more hydrophobic portion) of the polymer particles is about 40° C. or higher. The MFFT or the $T_g$ of the bulk material may be any temperature that enables the polymer particles to be inkjet printed without becoming too soft at the printer operating temperatures.

The polymer particles may have a MFFT or $T_g$ ranging from about 125° C. to about 200° C. In an example, the polymer particles may have a MFFT or $T_g$ of about 160° C.

In an example, the binder is present in the combined agent in an amount ranging from about 1 wt % to about 30 wt % based on a total weight of the combined agent. In another example, the binder is present in the combined agent in an amount ranging from about 2 wt % to about 25 wt % based on the total weight of combined agent.

An example formulation of the boundary fluid that does include a binder is shown in Table 2. This example includes Kureha S2640 as the thermally expandable particle.

TABLE 2

| Component Type | Example Specific Components | Target (wt %) |
|---|---|---|
| Co-solvent | 2-methyl-1,3-propanediol | 9 |
|  | 2-pyrrolidinone | 16 |
| Surfactant/ Dispersing aid | Tergitol ® 15-S-7 | 1 |

TABLE 2-continued

| Component Type | Example Specific Components | Target (wt %) |
|---|---|---|
| Antimicrobial | Acticide ® B20 | 0.15 |
| Thermally Expandable particle | Kureha S2640 | 14.6 |
| Binder | Acrylic latex | 10 |
| Water | Deionized Water | Balance |

B. Other Binders

The polymer binder may be a semi-crystalline polymer, such as polypropylene and polyethylene. The polymer binder may be a non-crystalline polymer, such as polyethylene oxide, polyethylene glycol (solid), acrylonitrile butadiene styrene, polystyrene, styrene-acrylonitrile resin, and polyphenyl ether. The polymer binder may be selected from the group consisting of polypropylene, polyethylene, low density polyethylene, high density polyethylene, polyethylene oxide, polyethylene glycol, acrylonitrile butadiene styrene, polystyrene, styrene-acrylonitrile resin, polyphenyl ether, polyamide 11, polyamide 12, polymethyl pentene, polyoxymethylene, polyethylene terephthalate, polybutylene terephthalate, polyvinylidene fluoride, polytetrafluoroethylene, perfluoro alkoxy alkane, polyphenylene sulfide, and polyether ether ketone.

The polymer binder may have a melting point temperature less than about 250° C., for example it may range from about 50° C. to about 245° C., for example from about 60° C. to about 240° C., and as a further example from about 70° C. to about 235° C.

The polymer binder may be present in the agent in an amount ranging from about 1% to about 6% by volume, for example from about 2% to about 5%, and as a further example from about 3% to about 5% by volume. In another aspect, the polymer binder may be present in the agent in an amount up to 100% by volume loading, for example, if using a piezo ink jet to jet the polymer precursor materials. The amount of the polymer binder may be chosen to provide shape integrity to the green body.

The agent may further include other suitable binders such as metal salts, sugars, sugar alcohols, polymeric or oligomeric sugars, low or moderate molecular weight polycarboxylic acids, polysulfonic acids, water soluble polymers containing carboxylic or sulfonic moieties, and polyether alkoxy silane. Some specific examples include glucose ($C_6H_{12}O_6$), sucrose ($C_{12}H_{22}O_{11}$), fructose ($C_6H_{12}O_6$), maltodextrins with a chain length ranging from 2 units to 20 units, sorbitol ($C_6H_{14}O_6$), erythritol ($C_4H_{10}O_4$), mannitol ($C_6H_{14}O_6$), or CARBOSPERSE® K7028 (a short chain polyacrylic acid, M~2,300 Da, available from Lubrizol). Low or moderate molecular weight polycarboxylic acids (e.g., having a molecular weight less than 5,000 Da) may dissolve relatively fast. It is to be understood that higher molecular weight polycarboxylic acids (e.g., having a molecular weight greater than 5,000 Da up to 10,000 Da) may be used; however the dissolution kinetics may be slower.

Binding Liquid Functional Agent

The binding liquid functional agent (i.e., binder fluid) may be used to pattern build material where it is desirable to form the 3D object. The binder fluid can be used with the boundary fluid that contains a binder or with the boundary fluid that does not contain a binder to pattern build material where it is desirable to form the intermediate part.

The binder fluid includes the binder. Any of the binders set forth herein for examples of the combined agent may be used in the binder fluid. In an example, the binder is present in the binder fluid in an amount ranging from about 1 wt % to about 30 wt % based on a total weight of the binder fluid. In another example, the binder is present in the binder fluid in an amount ranging from about 2 wt % to about 20 wt % based on the total weight of binder fluid.

In addition to the binder, the binder fluid may also include water, co-solvent(s), surfactant(s) and/or dispersing aid(s), antimicrobial agent(s), and/or anti-kogation agent(s). In these examples, any of the previously described co-solvent(s), surfactant(s) and/or dispersing aid(s), antimicrobial agent(s), and/or anti-kogation agent(s) may be used in any of the given amounts, except that the weight percentages are with respect to a total weight of the binder fluid.

The composition of the binding liquid functional agent is similar to examples of the boundary fluid except that the thermally expandable particle(s) is excluded from the formulation of the binding liquid functional agent.

An example formulation of the binding liquid functional agent is shown in Table 3.

TABLE 3

| Component Type | Example Specific Components | Target (wt %) |
|---|---|---|
| Co-solvent | 2-methyl-1,3-propanediol | 9 |
|  | 2-pyrrolidinone | 16 |
| Surfactant/ Dispersing aid | Tergitol ® 15-S-7 | 1 |
| Antimicrobial | Acticide ® B20 | 0.15 |
| Latex particles | Acrylic latex dispersion | 10 |
| Water | Deionized Water | Balance |

Methods

An example of the 3D printing method 100, in which a boundary fluid and a binder fluid are used, is depicted in FIG. 1. Generally, the method 100 includes patterning build material layers to form an intermediate structure, the patterning including; selectively applying a binder fluid to define a patterned intermediate part; and selectively applying i) the binder fluid and a separate agent including thermally expandable particle or ii) a combined agent including a binder and the thermally expandable particle or (iii) a separate agent including thermally expandable particles to define a boundary area adjacent to at least a portion of the patterned intermediate part (reference numeral 102); wherein the intermediate structure has unconsolidated clinging particles still attached that need to be removed; and heating the intermediate structure to a temperature that activates the thermally expandable particle to expand and exert a force against the unconsolidated clinging particles that surround them outside the object perimeter; and de-caking from the green part without any manual brushing of unconsolidated clinging powder, or with minimal brushing. (reference numeral 104). Finally, a green part that no longer has unconsolidated powder attached to it is obtained.

The build material 14 may be spread to form the layers 12, 12A, 12B, etc. on a build area platform 16, and the respective layers 12, 12A, 12B, etc. may be patterned with the binder fluid one layer at a time. Examples of the spreading of the build material 14 and the application of the various agents to pattern are described in more detail in reference to FIGS. 2A-2D. The binder fluid is used to pattern the patterned intermediate part 25, and either i) the binder fluid and the boundary fluid including the thermally expandable particle or ii) the combined agent including both the binder and the thermally expandable particle or (iii) a separate agent including thermally expandable particles is used to pattern the build material boundary area 50.

Another, more specific example of the 3D printing method 100 is shown in FIGS. 2A through 2D. Any examples of the build material, the binder fluid, and the boundary fluid described herein may be used in this example of the method 100. Moreover, the printing system, will be discussed in detail in conjunction with FIGS. 2A through 2D.

Figure 2A:
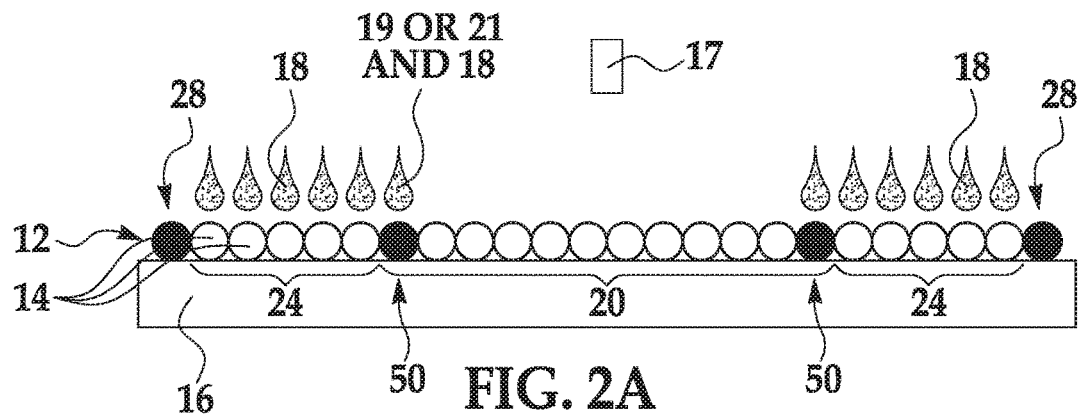
FIGS. 2A through 2D are schematic and partially cross-sectional views depicting the formation of a 3D object using an example of the 3D printing method disclosed herein.
Figure 2B:
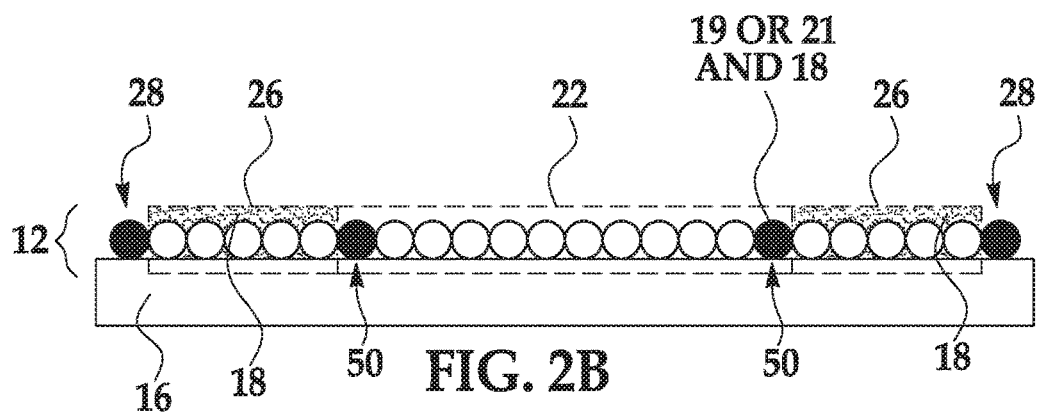
Figure 2C:
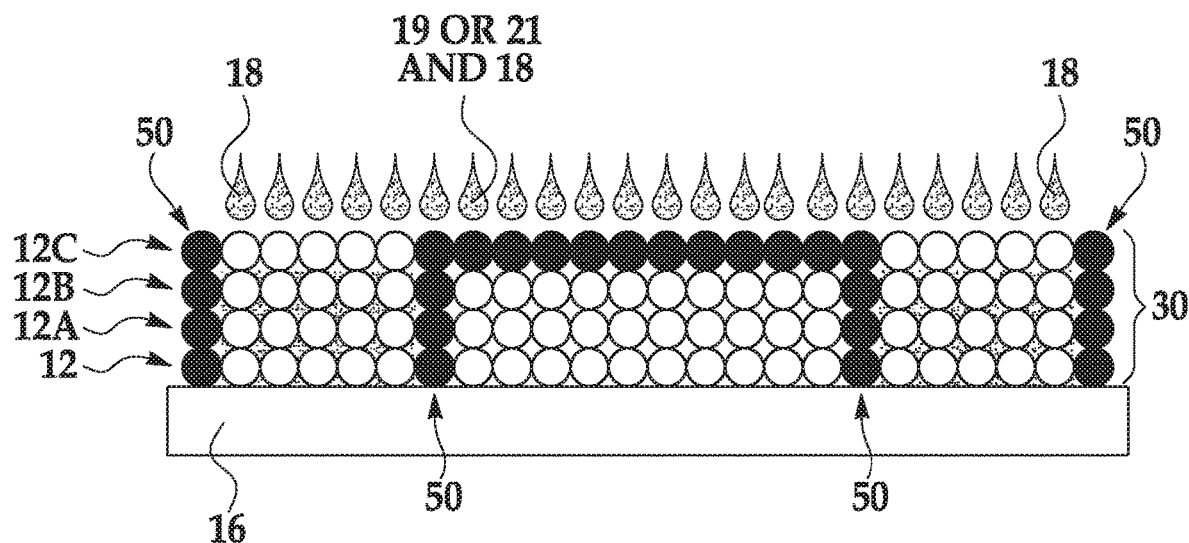
Figure 2D:
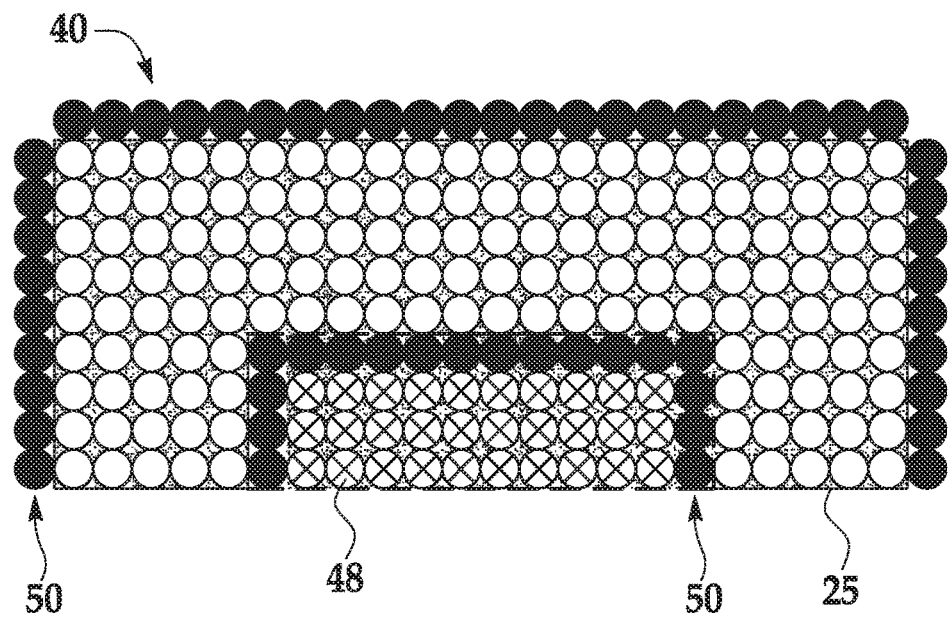

In this example of the method, patterning the build material layers includes selectively applying i) the binder fluid 18 and a boundary fluid 21 including a thermally expandable particles or ii) a combined agent 19 including a binder and the thermally expandable particles, or (iii) a separate agent including thermally expandable particles on a portion 50 of an initial build material layer 12, thereby forming a layer of the build material boundary area (see FIGS. 2A and 2B); selectively applying the binder fluid 18 on another portion 24 of the initial build material layer 12 to define a layer 26 of the patterned intermediate part (see FIGS. 2A and 2B) thereby forming the intermediate structure 40 (FIG. 2D).

An example of the patterning of the initial build material layer 12 is shown in cross-section in FIGS. 2A and 2B. Prior to patterning, build material particles 14 may be applied to form the layer 12, and then the layer 12 may be patterned. In the example shown in FIG. 2A, one build material layer 12 including build material particles 14 has been deposited on (i.e., applied to, formed on, etc.) the build area platform 16 and patterned.

In the example shown in FIG. 2A, the binder fluid 18 is selectively applied to the portion(s) 24 of the build material layer 12 in order to pattern a first patterned layer (26, FIG. 2B) of the patterned intermediate part. The portion(s) 24 of the initial build material layer 12 to which the binder fluid 18 is selectively applied may be respectively defined by a 3D model of the 3D object that is to be formed. The binder fluid 18 is deposited interstitially in the openings or voids between the build material particles 14. Capillary flow can move the binder fluid 18 between the individual build material particles 14 in the areas 24.

Also in the example shown in FIG. 2A, (i) the binder fluid 18 and a boundary fluid 21 including a thermally expandable particle and not including a binder, or (ii) a combined agent 19 including the binder and the thermally expandable particle or (iii) a separate agent including thermally expandable particles is/are selectively applied to the portion(s) 50 of the build material layer 12 in order to pattern a first patterned layer (22, FIG. 2B) of the build material boundary area 28 and 50 (shown in FIG. 2A).

When the combined agent 19 is used to define the build material boundary area 28 and 50, the combined agent 19 may be dispensed from an applicator that is similar to applicator 17 (i.e., may be a thermal inkjet printhead, a piezoelectric printhead, etc.), and that may be operated in the same manner as described hereinbelow for the applicator 17. In another example, the applicator 17 may have separate chambers that contain the combined agent 19 and the binder fluid 18 (e.g., used to pattern the patterned intermediate part 25), and may also have separate printheads, nozzles, etc. for separately and selectively dispensing the two agents 19, 18.

The applicator 17 may be used to selectively apply any of the agents 18, 19, 21. The applicator 17 may include nozzles, fluid slots, and/or fluidics for dispensing the agent(s) 18, 19, 21. The applicator 17 may be a thermal inkjet printhead or print bar, a piezoelectric printhead or print bar, or a continuous inkjet printhead or print bar. While a single applicator 17 is shown in FIG. 2A, it is to be understood that multiple applicators 17 may be used.

Referring specifically now to FIG. 2B, the selective application of the binder fluid 18 onto the build material particles 14 within the area 24 results in the formation of a patterned layer 26, which is to become part of a patterned intermediate part 25 (FIG. 2D), which is ultimately to be sintered to form the 3D object/part. More particularly, in the example shown in FIG. 2B, the patterned layer 26 is the first layer of the 3D object being formed.

FIG. 2C depicts the repeated application of build material particles 14 to form the other build material layers 12A, 12B, 12C and the repeated patterning of these additional build material layers 12A, 12B, 12C over the initial layer 12 of patterned build material. In the example depicted in FIG. 2C, four build material layers 12, 12A, 12B, 12C have been applied and patterned to form the complete build material boundary area 50 located underneath what is to become the patterned intermediate part (25 in FIG. 2D) and a portion of the build material boundary area 50 located at the outside perimeter of the patterned intermediate part (25 in FIG. 2D).

In any of the examples disclosed herein, the intermediate structure 40 may be part of a build material cake including the intermediate structure 40 and any non-patterned build material 48.

During and/or after the formation of the intermediate structure 40, the liquid components of the binder fluid 18 and the boundary fluid 21 or the combined agent 19 may be at least substantially evaporated to form a partially consolidated intermediate part 25. In some examples, the liquid components (e.g., water, solvents) may be substantially evaporated during the layer by layer patterning process and/or while the intermediate structure 40 is on the build area platform. In these examples, additional heating may be used in order to remove water and solvents, which may activate the binder to generate a partially consolidated intermediate structure 40.

At least substantially evaporating the liquid components (with or without heating) activates the binder, and the activated binder provides enough binding strength to hold the partially consolidated intermediate structure 40 together with enough mechanical stability to survive removal from the build bed. As such, the partially consolidated intermediate structure 40 exhibits handleable mechanical durability and is capable of being separated from the non-patterned build material 48. Use of thermally expandable particles make this separation of unconsolidated powder 48 more effective compared to simple brushing away operation and does not damage features of the part.

In general, the temperature at which the thermally expandable particles expand is greater than the temperature needed to remove sufficient liquid material and activate the binder but less than the temperature needed to decompose the binder. Once the partially consolidated intermediate structure 40 is removed from the bed, there is often unconsolidated material, such as 48, which remains clinging to the partially consolidated intermediate structure. Instead of attempting to manually remove the unconsolidated material, the partially consolidated intermediate part can be heated to a temperature sufficient to cause expansion of the thermally expandable particles. When the thermally expandable particles expand, they exert a force on the surrounding area. Since the patterned intermediate part 25 is strong relative to the unconsolidated material 48, the thermally expandable particles will have minimal effect on the patterned intermediate part. Instead, the thermally expandable particles will tend to push away the unconsolidated material. As a result, minimal brushing away of the clinging powder is needed.

The partially consolidated intermediate structure 40 may be extracted from the build bed or separated from the non-patterned build material by any suitable means. In an example, the partially consolidated intermediate structure 40 may be extracted by lifting the partially consolidated intermediate structure 40 from the non-patterned build material. Any suitable extraction tool may be used. In some examples, the partially consolidated intermediate structure 40 may be cleaned to remove non-patterned build material from its surface. In an example, the partially consolidated intermediate structure 40 may be cleaned with a brush and/or an air jet, may be exposed to mechanical shaking, or may be exposed to other techniques that can remove at least some of the non-patterned build material.

After the partially consolidated intermediate structure 40 is extracted from the build bed, it may be placed in a heating mechanism. If after excavation from the build area platform 16, the partially consolidated intermediate structure 40 still contains an undesirable amount of less-volatile solvent(s), the post-excavation baking may be performed at a temperature that will evaporate these solvent(s).

The series of temperatures may involve heating the (partially consolidated) intermediate structure 40 to the heat curing temperature of the binder while part is still in the bed followed by removing the green part from the bed; and heating the green part to an expansion temperature to decake the unconsolidated clinging material; and then heating the thus obtained green part to debinding temperature and; then heating to the sintering temperature. Briefly, the de-binding temperature removes the binder from the partially consolidated intermediate structure 40 to produce an at least substantially binder-free intermediate structure, and the at least substantially binder-free intermediate structure may be sintered at the various temperatures to form the final 3D object. Heating to de-bind and heating to sinter may take place at several different temperatures, where the temperature for de-binding is lower than the temperatures for sintering.

Heating to de-bind is accomplished at a thermal decomposition temperature that is sufficient to thermally decompose the binder. As such, the temperature for de-binding depends upon the binder in the agents 18, 19 used. In an example, the thermal decomposition temperature ranges from about 250° C. to about 600° C. In another example, the thermal decomposition temperature ranges from about 300° C. to about 550° C. The binder may have a clean thermal decomposition mechanism (e.g., leaves non-volatile residue in an amount <5 wt % of the initial binder, and in some instances non-volatile residue in an amount <1 wt % of the initial binder). The smaller residue percentage (e.g., close to 0%) is more desirable.

While not being bound to any theory, it is believed that the at least substantially binder-free intermediate structure may maintain its shape due, for example, to one or more of: i) the low amount of stress experienced by the at least substantially binder-free part due to it not being physically handled, and/or ii) low level necking occurring between the build material particles 14 at the thermal decomposition temperature of the binder. The at least substantially binder-free intermediate structure may maintain its shape although the binder is at least substantially removed and the build material particles 14 are not yet sintered.

The temperature may be raised again to finish the stages of sintering. During final sintering, the build material particles 14 continue to coalesce to form the 3D object 25 and so that a desired density of at least the 3D object 25 is achieved.

What is claimed is:

1. A three-dimensional object printing kit, comprising:
   a build material selected from the group consisting of a metallic build material and a ceramic build material;
   a polymeric binder dispersed in an aqueous liquid vehicle; and
   a boundary fluid consisting of water, thermally expandable particles each having a hydrocarbon liquid core and a polymeric shell, and optionally at least one additive selected from the group consisting of a co-solvent and an antimicrobial agent.

2. The three-dimensional object printing kit of claim 1, wherein the build material is the metallic build material, and wherein the metallic build material is selected from the group consisting of steel, bronze, titanium, titanium alloys, aluminum, aluminum alloys, nickel, nickel alloys, cobalt, cobalt alloys, iron, iron alloys, nickel cobalt, nickel cobalt alloys, gold, gold alloys, silver, silver alloys, platinum, platinum alloys, copper, copper alloys, zirconium, zirconium alloys, and a combination thereof.

3. The three-dimensional object printing kit of claim 1, wherein the build material is the metallic build material, and wherein the metallic build material is selected from the group consisting of AlSi10Mg, 2xxx series aluminum, 4xxx series aluminum, CoCr MP1, CoCr SP2, Maraging Steel MS1, Hastelloy C, Hastelloy X, NickelAlloy HX, SS GP1, SS 17-4PH, SS 316L, SS 430L, Ti6Al4V, Ti-6Al-4V ELI7, and combinations thereof.

4. The three-dimensional object printing kit of claim 1, wherein the polymeric binder comprises latex polymer particles dispersed in an aqueous liquid vehicle, and wherein the latex polymer particles are made from (A) a co-polymerizable surfactant and (B) styrene, p-methyl styrene, α-methyl styrene, methacrylic acid, acrylic acid, acrylamide, meth acrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinyl benzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated benzyl methacrylate, polypropylene glycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinyl carbazole, N-vinyl-caprolactam, or combinations thereof.

5. The three-dimensional object printing kit of claim 1, wherein the thermally expandable particles are present in the boundary fluid in an amount of from about 1 weight percent to about 25 weight percent, based on the total weight percent of the boundary fluid.

6. The three-dimensional object printing kit of claim 1, wherein the thermally expandable particles are heated to a temperature of from about 80° C. to about 250° C.

7. A method for three-dimensional (3D) printing, comprising:
   patterning layers of a build material to form an intermediate structure, wherein the build material is selected from the group consisting of a metallic build material and a ceramic build material, and the patterning including:
      selectively applying a polymeric binder dispersed in an aqueous liquid vehicle to define a patterned intermediate part; and
      selectively applying a boundary fluid adjacent to the patterned intermediate part, the boundary fluid consisting of water, thermally expandable particles each having a hydrocarbon liquid core and a polymeric shell, and optionally at least one additive selected from the group consisting of a co-solvent and an antimicrobial agent; and
   heating the intermediate structure to cause the thermally expandable particles to expand and exert a force on unconsolidated build material clinging to the intermediate structure to cause the unconsolidated build material to fall off from the intermediate structure.

8. The method for three-dimensional printing of claim 7, wherein the polymeric binder comprises latex particles, and wherein the latex polymer particles are made from (A) a co-polymerizable surfactant and (B) styrene, p-methyl styrene, α-methyl styrene, methacrylic acid, acrylic acid, acrylamide, meth acrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinyl benzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated benzyl methacrylate, polypropylene glycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinyl carbazole, N-vinyl-caprolactam, or combinations thereof.

9. The method for three-dimensional printing of claim 7, wherein:
   the build material is the metallic build material, and wherein the metallic build material is selected from the group consisting of steel, bronze, titanium, titanium alloys, aluminum, aluminum alloys, nickel, nickel alloys, cobalt, cobalt alloys, iron, iron alloys, nickel cobalt, nickel cobalt alloys, gold, gold alloys, silver, silver alloys, platinum, platinum alloys, copper, copper alloys, zirconium, zirconium alloys, and a combination thereof; or
   the build material is the ceramic build material, and wherein the ceramic build material is selected from the group consisting of an oxide, a nitride, a carbide, an aluminum oxide, aluminum-calcium-phosphorus oxides, bio glasses, boron nitride, boron carbide, borosilicate glass, calcium aluminates, calcium sulfates, ceravital, corals, ferric-calcium-phosphorus oxides, hydroxyapatites, dense hydroxyapatites, silica, silicon boride, silicon oxide, silicon nitride, titanium oxide, titanium nitride, tri-calcium phosphate, zinc-calcium-phosphorus oxides, zinc sulfate-calcium-phosphorus oxides, zinc oxide, zirconia, hydroxyapatite, alumina, oxide glass, and a combination thereof.

10. The method for three-dimensional printing of claim 7, wherein the thermally expandable particles are selected from the group consisting of plastic microspheres, phenolic and amino-based spheres, thermoplastic microspheres, and combinations thereof.

11. The method for three-dimensional printing of claim 7, wherein after the heating, the method further comprises sintering the intermediate structure to a sintering temperature of the build material to form a 3D object.

12. The method for three-dimensional printing of claim 7, wherein the patterning of the build material layers includes:
    iteratively applying individual build material layers;
    selectively applying the polymeric binder to each of the individual build material layers to define several layers of the patterned intermediate part; and
    selectively applying the boundary fluid on each of the individual build material layers to define a patterned connection between the build material layers and the unconsolidated powder particles.

13. A multi-fluid kit for three-dimensional (3D) printing, comprising:
    a polymeric binder dispersed in an aqueous liquid vehicle, wherein the polymeric binder comprises an aqueous liquid vehicle and latex polymer particles dispersed in the aqueous liquid vehicle, and wherein the latex polymer particles are made from (A) a co-polymerizable surfactant and (B) styrene, p-methyl styrene, α-methyl styrene, methacrylic acid, acrylic acid, acrylamide, meth acrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinyl benzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated benzyl methacrylate, polypropylene glycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinyl carbazole, N-vinyl-caprolactam, or combinations thereof; and
    a boundary fluid comprising thermally expandable particles each having a hydrocarbon liquid core and a polymeric shell.

14. The three-dimensional object printing kit of claim 1, wherein the build material is the ceramic build material, and wherein the ceramic build material is selected from the group consisting of an oxide, a nitride, a carbide, an aluminum oxide, aluminum-calcium-phosphorus oxides, bio glasses, boron nitride, boron carbide, borosilicate glass, calcium aluminates, calcium sulfates, ceravital, corals, ferric-calcium-phosphorus oxides, hydroxyapatites, dense hydroxyapatites, silica, silicon boride, silicon oxide, silicon nitride, titanium oxide, titanium nitride, tri-calcium phosphate, zinc-calcium-phosphorus oxides, zinc sulfate-calcium-phosphorus oxides, zinc oxide, zirconia, hydroxyapatite, alumina, oxide glass, and a combination thereof.

\* \* \* \* \*